United States Patent
Karpovsky et al.

(10) Patent No.: US 11,647,035 B2
(45) Date of Patent: May 9, 2023

(54) FIDELITY OF ANOMALY ALERTS USING CONTROL PLANE AND DATA PLANE INFORMATION

(71) Applicant: MICROSOFT TECHNOLOGY LICENSING, LLC, Redmond, WA (US)

(72) Inventors: Andrey Karpovsky, Haifa (IL); Roy Levin, Haifa (IL); Tomer Rotstein, Haifa (IL); Michael Makhlevich, Haifa (IL); Tamer Salman, Haifa (IL); Ram Haim Pliskin, Rishon Iezion (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 291 days.

(21) Appl. No.: 17/021,801

(22) Filed: Sep. 15, 2020

(65) Prior Publication Data

US 2022/0086180 A1    Mar. 17, 2022

(51) Int. Cl.
G06F 15/173 (2006.01)
H04L 9/40 (2022.01)
G06N 20/00 (2019.01)
G06N 7/00 (2023.01)
H04L 41/06 (2022.01)

(52) U.S. Cl.
CPC ........ *H04L 63/1425* (2013.01); *G06N 7/005* (2013.01); *G06N 20/00* (2019.01); *H04L 41/06* (2013.01)

(58) Field of Classification Search
None
See application file for complete search history.

(56) References Cited

U.S. PATENT DOCUMENTS

| | | | |
|---|---|---|---|
| 11,406,053 B1* | 8/2022 | Hu | G06N 7/005 |
| 2016/0149944 A1 | 5/2016 | Obermeier et al. | |
| 2019/0020667 A1 | 1/2019 | Parker | |
| 2019/0098046 A1* | 3/2019 | Schlamp | H04L 45/22 |
| 2019/0281078 A1* | 9/2019 | Eguiarte Salazar | H04L 63/162 |
| 2020/0007405 A1* | 1/2020 | Chitalia | G06F 9/5072 |
| 2020/0076677 A1 | 3/2020 | Mermoud et al. | |
| 2022/0060491 A1* | 2/2022 | Achleitner | H04L 63/1416 |
| 2022/0086179 A1* | 3/2022 | Levin | H04W 12/63 |
| 2022/0191173 A1* | 6/2022 | Karpovsky | H04L 63/0236 |

OTHER PUBLICATIONS

"International Search Report and Written Opinion Issued in PCT Application No. PCT/US21/035562", dated Sep. 16, 2021, 9 Pages.

* cited by examiner

*Primary Examiner* — Phuoc H Nguyen
(74) *Attorney, Agent, or Firm* — Newport IP, LLC; Han K. Gim (57) ABSTRACT

An indication is received of a security alert. The indication is generated based on a detected anomaly in one of a data plane or a control plane of a computing environment. When the detected anomaly is in the data plane, the control plane is monitored for a subsequent anomaly in the control plane, and otherwise the data plane is monitored for a subsequent anomaly in the data plane. A correlation between the detected anomalies is determined. A notification of the security alert is sent when the correlation exceeds a predetermined threshold.

20 Claims, 8 Drawing Sheets

FIDELITY OF ANOMALY ALERTS USING CONTROL PLANE AND DATA PLANE INFORMATION

BACKGROUND

Computer networks are under constant threat from malicious parties seeking unauthorized access to the systems hosted thereon. The tactics used by malicious parties to attack networks and the tactics used by network administrators to defend against attacks are constantly evolving as the tactics are updated. New exploits are added to the arsenal of malicious parties and ineffective exploits are dropped. Implementing countermeasures, however, is often reactive, where network administrators must wait to identify the newest exploit before deploying a countermeasure and determining when to stop deploying a countermeasure when the corresponding exploit is no longer used. Correctly anticipating, identifying, and blocking the new exploits is crucial to maintaining security of a network. Furthermore, it is desirable to avoid raising false alerts, which can hinder efforts to effectively respond to the exploits. It is with respect to these considerations and others that the disclosure made herein is presented.

SUMMARY

A threat detection (TD) service is a ubiquitous security feature, expected of any service that handles sensitive data. A TD service goal is to alert security personnel of potential breaches or vulnerabilities in the most efficient manner; in particular by providing timely, accurate, concise, and descriptive alerts. When using anomaly detection to identify attacks, an alert that is related to an entity of a computing device such as a computer name or IP address and that indicates a potential anomaly may be generated by the TD service. In response, data sources that log information about the computing system may then be subjected to anomaly detection procedures to discover any anomalies and if they are of a malicious type. For example, one type of alert may be an access anomaly where an access to a resource from a new IP address or new username generates an alert.

Accuracy requirements for TD services can thus be very high, both in terms of precision and recall. Most actual malicious events are expected to be detected (recall); otherwise the service loses credibility. Likewise, most raised alerts are expected to be related to malicious events (precision), otherwise false positives can lead to alert churn.

Typically, an alert is a combination of a statistical anomaly (that is, an event that is rare and significantly different from common events) and a security scenario (meaning that the event or chain of events are related to a known attack pattern). A known problem with this approach is that rare but legitimate events (such as a developer performing a monthly backup of server data or changing the firewall rules due to expanded deployment) are difficult to differentiate from rare and malicious events with similar patterns (e.g., a hacker dumping server data to their storage or compromising firewall rules to allow unauthorized access).

The present disclosure describes technologies that enable higher fidelity of security alerts. Various embodiments are described for increasing both recall and precision aspects of accuracy by using two sources of signals—the data plane and the control plane. The use of both sources allows for an improved probabilistic model for determining statistical anomalies, and further enables a more accurate narrative that fits suspicious scenarios and allows for differentiation between the two types of cases described above.

The data plane typically refers to operations that are directly relevant to data stored in a computing environment, such as logging in to a server, processing and copying data, etc. Data plane access anomalies may be raised when a new entity (for example an IP address) successfully accesses a resource (for example, a SQL server). A new entity may refer to a situation where the entity has not been observed at the resource during a modeling period (e.g., two months).

The new access can be attributed to two scenarios:
(1) a legitimate user (new or known) accessing the resource from a new location; in this case a raised alert would be false positive;
(2) a malicious user (e.g., after brute forcing or stealing credentials) accessing the resource from a new location; in this case the alert is a true positive.

The present disclosure describes a way to differentiate between these two cases by combining the logs of data plane activity with logs of correlated control plane activity. In one embodiment, the control plane may refer to all operations relevant to the control of a computing environment, such as creating and deleting resources, setting policy and security rules, etc. An anomaly in the control plane may occur, for example, when a user performs an anomalous pattern or amount of operations, possibly on a resource that the user does not normally access. In one embodiment, the correlation of the two signals may be determined based on a similarity of the {resource, entity, time-window} tuple.

By improving the accuracy of access anomaly alerts in terms of both precision and recall, an improved user experience can be provided for TD services by allowing the security teams to focus on high-fidelity alerts and decreasing churn due to false positives. The described embodiments may be implemented with a fast time to detection since the methods may be implemented in a proactive mode where after an alert is detected on one of the planes, an active listening mode may be activated and a subsequent anomaly on the second plane may be used to determine if an alert is to be triggered. Additionally, the use of both the data and control planes may provide more comprehensive information for subsequent analysis and improvement of the system.

While various embodiments are described in the context of security threat detection, the disclosed techniques may be implemented in other scenarios such as system performance monitoring.

The described techniques may allow networks and data centers to provide improved security, more effectively adhere to operational objectives, and improve operating efficiencies. The described techniques may also be used, for example, for detecting anomalies in processes which can be useful in various contexts such as computing, information management, and so forth. By providing the disclosed mechanism for improving the fidelity of anomaly alerts, potentially malicious attempts to access a system and loss of data and services may be avoided or mitigated, reducing downtime and impact to end users and providing for improved security and operational efficiency for computing networks and service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Anomaly detection systems may be used to detect anomalies in various computing systems and environments. In a typical scenario, an alert may be generated that is related to an entity of the computing system. The entity may be a computer name or IP address, for example, and the alert may indicate that a potential malicious activity is present in the computing system or environment. In response, data sources that log information about the computing system may then be subjected to anomaly detection to discover any anomalies and if they are of a malicious type.

In many computing systems, a human analyst is needed to investigate the alert to determine if there are any anomalies and if they are of the malicious type. This process can be time consuming if there are a large number of data sources to search when investigating the alert. This may also lead to expending a significant amount of time for the anomaly detection and an increased use of computing resources. In addition, it may also lead to an increased number of false positives that represent a loss of time and resources to investigate and confirm that the alert did not indicate an actual attack. An alert fatigue problem may result from the large number of false positive (FP) cases that analysts deal with when monitoring alerts.

The embodiments disclosed herein provide a method for detecting potential anomalies while reducing false positives. Once a potential anomaly is detected, a process can be invoked to increase the accuracy of the detection, thus reducing the number of false positives. Various embodiments are described for increasing both aspects of accuracy (e.g., precision and recall) by using two sources of signals—the data plane and the control plane. The use of both sources may allow for an improved probabilistic model for determining statistical anomalies, and further enable a more accurate narrative that fits suspicious scenarios and allows for differentiation between the two types of cases described above.

The data plane typically refers to operations that are directly relevant to data stored in a computing environment, such as logging in to a server, processing and copying data, etc. Data plane access anomalies may be raised when a new entity (for example an IP address) successfully accesses a resource (for example, a SQL server). A new entity may refer to a situation where the entity has been observed at the resource during a modeling period (e.g., two months).

The new access can be attributed to two scenarios:

(1) a legitimate user (new or known) accessing the resource from a new location; in this case a raised alert would be false positive;

(2) a malicious user (e.g., after brute forcing or stealing credentials) accessing the resource from a new location; in this case the alert is a true positive.

The present disclosure describes a way to differentiate between these two cases by combining the logs of data plane activity with logs of correlated control plane activity. In one embodiment, the control plane may refer to all operations relevant to the control of a computing environment, such as creating and deleting resources, setting policy and security rules, etc. An anomaly in the control plane may occur, for example, when a user performs an anomalous pattern or amount of operations, possibly on a resource that the user does not normally access. In one embodiment, the correlation of the two signals may be determined based on a similarity of the {resource, entity, time-window} tuple.

In one example, in the data plane, a successful login may be made to a SQL server 'contoso-srv' from IP '143.23.x.x', mapped to Boston. In the example, previous logins to this server were made from IP range '62.34.x.x', owned by a data center in Redmond, and IP range '23.57.x.x' mapped to Washington. In the control plane, firewall rules may have been changed via the portal on server 'contoso-srv' and a new SQL user may have been created 10 minutes before the alert was triggered, coming from the same IP that triggered the alert ('143.23.x.x'). The user performing the operations was 'elvis@dpcp.org'.

In Scenario A, the same user performed similar operations on four different days during a two-week period before the alert, coming from IPs in the same area.

In Scenario B, the same user never performed any similar operation on resources from this resource group during the two-week period before the alert. This would mean that there was no activity in the control plane, which is suspicious as it was never seen before.

In this case, similar {resource, entity, time-window} details may be used to correlate the data plane anomaly (unexpected login and access to data) and the control plane anomaly (unexpected firewall rules changes). In scenario A, the previous history of the same user may indicate that the operations were routine, and that the activity may be indicative of a developer working from a new location and that an alert should not be triggered. In scenario B, the control plane operations anomaly (the operation is the first of its kind) may further inform and alter the conclusion based only on the data plane anomaly. Based on the control plane observation, a suspicious login made possible by a compromised identity may be inferred, indicating that a high-fidelity alert should be raised.

In some embodiments, a general mutual enrichment approach may be implemented. Both data plane and control plane activity logs may be monitored for anomalies. When an anomaly is detected on one plane, the system may enter an active listening mode, where a subsequent anomaly on the other plane may trigger a combined high-fidelity alert. This differs from a conventional fusion approach since this model is proactive (and not retroactive), which allows the generation of high-fidelity and explainable alerts with reduced TTD (time to detect).

The models used to infer the anomaly score of data plane and control plane activity can differ, and can be implemented using statistical/probability models, machine learning or a rule-based approach, or any combination thereof. Access anomalies are a common type of alert, and continuous feedback may be received from users receiving these alerts. Such user feedback (negative and positive) may be used as labels in a supervised learning approach for the anomaly models.

In an embodiment, data plane anomalies may be determined based on an estimated probability model of an appearance of a new entity. If the estimated probability is below a predetermined threshold, the appearance of a new entity may constitute an anomaly. In an embodiment, a control plane anomaly model may be implemented using a score-based method for each user active at a resource as a time series signal, such that a high outlier of a score may signify an unexpected spike in relevant and significant control plane activity. This method is further detailed below.

Once an alert is identified as a real attack, a mitigation action may be employed. The mitigation action may include cleaning the compromised resources (e.g., removing malicious files), setting protections means (e.g., resetting passwords, changing network configurations), or other measures.

Referring to the appended drawings, in which like numerals represent like elements throughout the several FIGURES, aspects of various technologies for detecting anomalies will be described. In the following detailed description, references are made to the accompanying drawings that form a part hereof, and which are shown by way of illustration specific configurations or examples.

Figure 1:
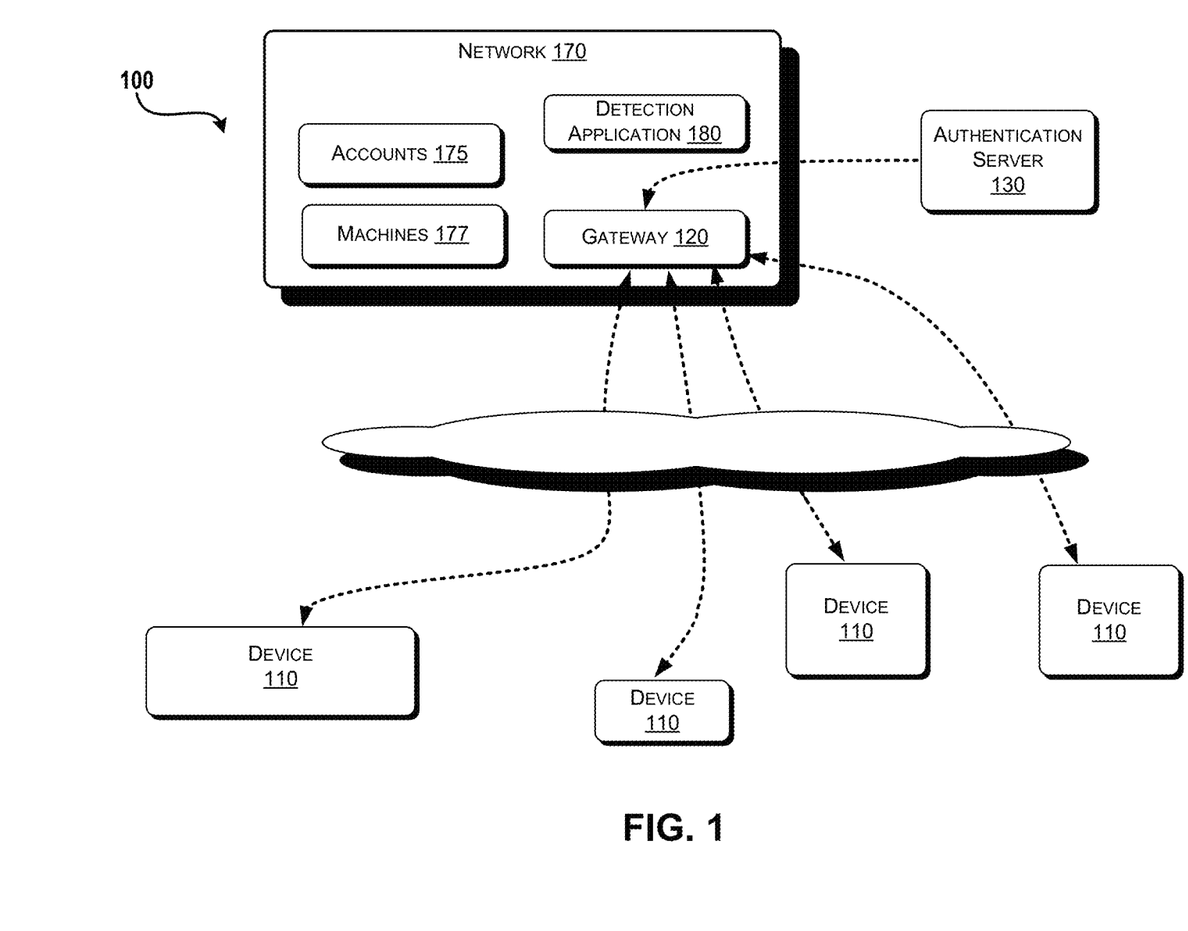
FIG. 1 is a diagram illustrating an example system implementing an anomaly detection function in accordance with the present disclosure.

FIG. 1 illustrates an example environment 100 in which authorization requests are handled by a system from various requesting devices. As illustrated, one or more devices 110 that are seeking authorization may attempt to gain access to accounts 175 or physical/virtual machines 177 hosted within the network 170. The devices 110 may connect to the network 170 via a gateway 120 which is in communication with the authentication server 130.

The authentication server 130 may be configured to handle the authorization or rejection of login attempts carried in authentication traffic. Although not illustrated, one of skill in the art will appreciate that various servers and intermediaries in a distributed network may be implemented between the devices 110 and the gateway 120 to route a message between the user and the network 170. As will also be appreciated, although some components of the example environment 100 are illustrated singly, in various aspects multiple copies of those components may be deployed, for example, for load balancing purposes, redundancy, or offering multiple services.

The devices 110 are illustrative of various computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIG. 6.

The devices 110 may be accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may attempt to access restricted resources which may be done without the knowledge or consent of the devices' owners. In another example, devices 110 may be the computing devices used by a legitimate user seeking to access an account which may make one or more attempts to access the account.

The gateway 120 may be a hardware device, such as a network switch, or a software service that links the devices 110 from the external network (e.g., the Internet) to the authentication server 130 over the network 170 (e.g., an intranet). In various aspects, the gateway device 120 may provide a firewall and may regulate the flow of communications traffic into and out of the local network 170. The gateway 120 may be configured to forward messages to the authentication server 130 from the devices 110 (as well as other devices on the internal network).

The authentication server 130 may receive authorization requests from the devices 110 and determine whether to grant access to accounts served by the network 170. The authentication server 130 may be a physical machine or a virtual machine that handles the authentication requests for the network 170 and acts as a domain controller. The authentication server 130 may use various authentication protocols including, but not limited to, PAP (Password Authentication Protocol), CHAP (Challenge-Handshake Authentication Protocol), EAP (Extensible Authentication Protocol), Kerberos, or an AAA (Authentication, Authorization, Accounting) architecture protocol, to allow a user access to one or more systems within a network 170. Depending on the standards used, the number of protected systems in the network 170 and user account settings, the successful presentation of authentication parameters will grant the devices 110 access to one or more systems safeguarded by the authentication server 130 and at an appropriate permissions level for the associated user.

In an embodiment, the authentication server 130 may execute a detection application 180 that is configured to access network traffic to monitor authentication traffic over the gateway 120 destined for the authentication server 130 to track data and determine whether any of the communications represent an anomaly that should be further investigated or mitigated. In some embodiments, the detection application 180 may be executed on a separate device with unique MAC and IP addresses from the other devices in the network 170 and receive copies of messages that are forwarded to the authentication server 130 from the gateway 120 via the Remote Network Monitoring (RMON) or Switch Monitoring (SMON) specifications, port mirroring, or similar forwarding scheme. In other aspects, the detection application 180 may intercept all network traffic bound for the authentication server 130 (either with the same MAC and IP address or unique addresses) or passively taps and listens to the transmission medium on which the communications are sent to the authentication server 130. In yet other aspects, the detection application 180 may execute on a virtual machine or as a process on the authentication server 130 and may thereby passively share communications received at the application server 130.

In the security context, the described methods can be used, for example, to detect anomalies in the names of entities (such as usernames, process names, IP addresses, etc.) that are accessing a resource (such as a server or storage account). This may be useful as a potential security alert, since such an entity may signify a new type of access with higher fidelity than simply detecting a new username. For example, such an access attempt may indicate an access via a dormant backdoor, or a new entity being created for persistent access.

As used herein, a domain may be defined as an administrative unit corresponding to a security boundary. Computers in a domain may share physical proximity on a local area network (LAN) or may be located in different geographic parts of the world and communicate over various types of physical connections, including ISDN, fiber, Ethernet, Token Ring, frame relay, satellite, and leased lines, etc. Domain administrators typically create one user account for each user within a domain and the users log on to the domain rather than repeatedly logging on to various individual resources in the domain. In addition, a domain controller may control various aspects of the domain such as individual use of resources on the domain. The users may access resources in the domain subject to user rights, privileges and system-wide policies. There may be predefined (built-in) user groups with sets of assigned user rights and domain administrators may assign user rights by adding a user account to one of the predefined user groups or by creating a new group and assigning specific user rights to that user group. Users who are subsequently added to a user group may automatically gain all user rights assigned to that user group.

In an embodiment, an agent or application 180 (referred to herein as "detection application") may be installed on domain controllers in a domain or other grouping of computing resources. The detection application may be configured to parse network traffic, access data stored in a data store, or otherwise access data to be analyzed for anomaly detection in usernames, IP addresses, and other data of interest. The detection application 180 may analyze data in the manner described herein. Based on the analyzed data, the detection application may identify potential anomalies and generate an alert for responsive/mitigation action.

Figure 2:
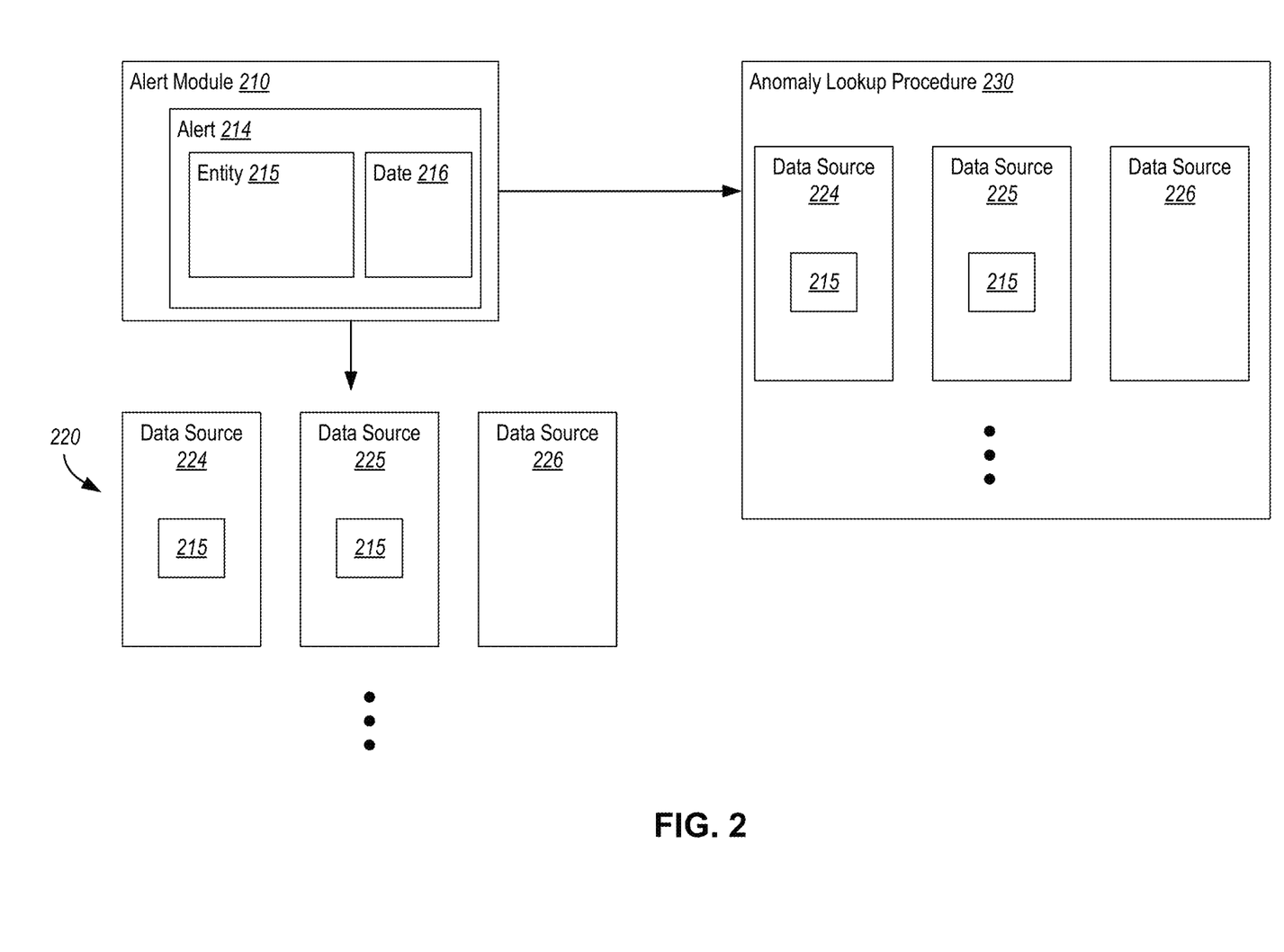
FIG. 2 illustrates an example environment for performing anomaly detection in a computing system.

FIG. 2 illustrates an environment 200 of a computing system. As illustrated, environment 200 includes an alert module 210 and various data sources 220, including data source 224, 225, 226, and any number of additional data sources as illustrated by ellipses 227. In some embodiments, the data sources 220 may include, but are not limited to, logs from one or more of a specific computer, routers on a network, an application, an operating system, network infrastructure, and cloud computing infrastructure. That is, during operation various elements of a computing system such as individual computers and like devices, operating systems and applications running on the computers, network infrastructure such as routers and the like, and cloud computing infrastructure all generate logs of their operations. It will be appreciated that additional computing system elements may also generate logs as needed.

The alert module 210, which may be part of a computing system that is different from those hosting the various data sources, may be configured in operation to generate an alert 214 when an anomaly of some sort is detected in one or more of the data sources 220 or is detected in some other reasonable way known to those of skill in the art. An anomaly may be considered a behavior or action by an entity (i.e., entity 215) that is outside of an expected behavior or action of the entity. An anomaly may include random operational occurrences that does not normally occur, such as a power surge or the like, that are generally not malicious in nature as they are not indicative of any bad intent by the entity that generates the anomaly. An anomaly may also include a malicious activity such as a brute force attack to overwhelm the security protections of the computing system, an attempt to fraudulently impersonate an entity, or an attempt to fraudulently make a purchase. These types of anomalies are malicious in nature as they are indicative of a bad intent against the computing system by the entity that generates the anomaly. In any event, the anomaly may cause the alert module to generate the alert 214.

An entity 215 may be associated with the alert 214. The entity 215 may identify a source of the anomaly that caused the alert to be generated. For example, the entity 215 (and all other entities discussed herein) may be, but is not limited to, a machine or computer name, a user name, an IP address, or a network identifier that identifies the source of the anomaly. If the entity 215 is a machine or computer name or a username, than this may specify that the anomaly was generated by or otherwise associated with that machine or computer or that specific user. Likewise, if the entity 215 is an IP address or a network identifier, then this may specify that the anomaly was generated by or otherwise associated with the specific IP address or network. Although only illustrated as including one entity 215, the alert 214 may include more than one entity 215 as circumstance warrant. A date 216 that may also include a time stamp that specifies the date and time of the anomaly may also be associated with the alert 214.

The environment 200 may also include an anomaly detection procedure 230. The anomaly detection procedure 230 may be an anomaly detection method as described herein, or any reasonable anomaly detection procedure such as various machine learning algorithms, timeline anomaly detection algorithms, and the like that are able to detect anomalies in the data sources. In operation, the anomaly detection procedure 230 may perform its given anomaly detection on the data sources 220 to determine if the anomaly or additional anomalies associated with the entity 215 may have occurred in one or more of the data sources 220 around the date and time specified by the date 216. This information may then be used to initiate corrective actions if the detected anomalies are indicative of malicious activity or if it is otherwise deemed that corrective actions would be beneficial.

As shown in FIG. 2, the anomaly detection procedure 230 performs its anomaly detection on all of the data sources 220. However, as also shown, only the data sources 224 and 225 include data that includes or is otherwise associated with the entity 215. The data source 226 and any potential data sources 227 do not include data that is associated with the entity 215. Accordingly, the anomaly detection procedure 230 may perform the anomaly detection on many data sources that will not provide any information as to anomalies associated with the entity 215.

Figure 3:
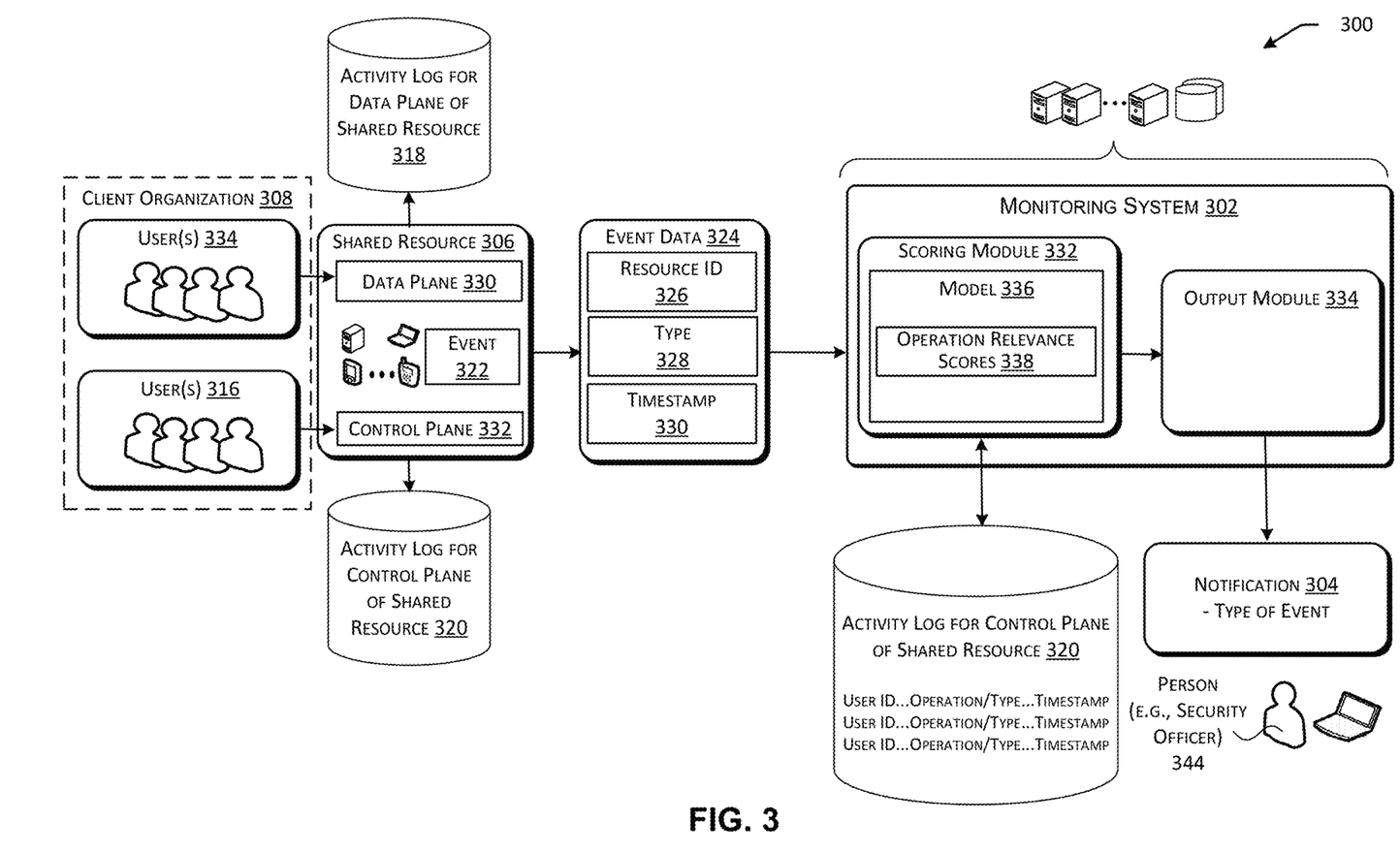
FIG. 3 illustrates an example environment for performing anomaly detection according to the embodiments disclosed herein.

FIG. 3 is a diagram illustrating an example environment 300 in which a monitoring system 302 is configured to generate or identify potential notifications 304. FIG. 3 illustrates a shared resource 306 that is configured for use by a client organization 308. The shared resource 306 can include a physical resource such as a server, a storage device, a user device (e.g., a personal computer, a tablet computer, a smartphone, etc.), a networking device, a physical network, and so forth. The shared resource 306 can additionally or alternatively comprise a virtual resource such as a virtual machine, a container, a virtual network, and so forth. Accordingly, the shared resource 306 may be one that is under control of an entity operating the monitoring system 302 (e.g., a network provider of a cloud-based platform). Alternatively, the shared resource 306 may be one that is under control of the client organization 308 yet is configured to be monitored by the monitoring system 302.

In various examples, use of the shared resource 306 can be split into different planes such as a data plane 330 and a control plane 132. In other words, an operation performed via the shared resource 306 may occur in one of the data plane 330 or the control plane 132. More specifically, common "data" operations (e.g., data read, data write, resource access, etc.) typically occur in the data plane 330 of the shared resource 306 and are performed by a first set of users 134 in the client organization 308. Further, "configuration" operations typically occur in the control plane 132 of the shared resource 306 and are performed by a second set of users 316. The second set of users 316 is most likely a smaller set compared to the first set of users 134 because the second set of users 316 includes a limited number of people (e.g., developers) authorized to change a configuration state of the shared resource 306. Users in the second set 316 may be referred to as administrators or owners of the shared resource 306.

Accordingly, one or more activity logs can be maintained and updated over time to reflect the operations performed on the shared resource 306. In one example, a first activity log 318 is maintained and updated to reflect the operations that occur in the data plane 330 of the shared resource 306, and a second activity log 320 is maintained and updated to reflect the operations that occur in the control plane 132 of the shared resource 306. Alternatively, the shared resource 306 may include a single activity log in which different operations can be labeled as data operations that occur in the data plane 330 or configuration operations that occur in the control plane 132. The labels can be used to sort and/or identify the operations that occur in the different planes. The example environment 300 illustrates that the activity logs can be maintained at the shared resource 306 or at the monitoring system 302.

FIG. 3 further illustrates an event 322 associated with the shared resource. In one example, the event 322 is triggered in the data plane 330 of the shared resource 306. For instance, the event 322 may be a threat detected based on a suspicious operation performed by one of the users 134, or some external user or device that is implementing a malicious cyberattack on the shared resource 306. Threat detection mechanisms (e.g., monitoring software) can be used by the monitoring system 302 and/or the shared resource 306 to detect the threat. The threat represents a situation where the shared resource 306 may be susceptible or exposed to a potential security issue, and therefore, further investigation is warranted and mitigation actions may be needed. In one example, the threat can be associated with an unauthorized or previously unseen data access for the shared resource 306 (e.g., a previously unseen Internet Protocol (IP) address has accessed a server). In another example, the threat can be associated with a cyberattack that attempts to gain access to the shared resource 306 by "cracking" user passwords (e.g., a brute force attack to guess passwords). In yet another example, the threat can be associated with a cyberattack that installs malware or other types of malicious software on the shared resource 306.

Alternatively, the event 322 can be triggered in the control plane 132 of the shared resource or by another resource (e.g., an update server). For example, the event 322 can correspond to a maintenance action such as an update (e.g., hardware, software, and/or firmware) that is to be installed on, or pushed to, the shared resource 306. In this situation, the shared resource 306 may need to be shut down or taken offline, and thus, it may be beneficial to contact a relevant resource owner to ensure that a shut down or network disconnection is acceptable for a particular time period.

In another example, the event 322 can correspond to the expiration of credentials (e.g., a user password, a certificate, etc.) associated with the shared resource 306. In this situation, it may be beneficial to contact a relevant resource owner to determine whether a specific user password or a certificate should be allowed to expire based on whether the corresponding user is still using the shared resource 306 (e.g., the user may have switched teams, the user may have left the client organization, etc.).

In yet another example, the event 322 can correspond to the inactivity of a user account associated with the shared resource 306. In this situation, it may be beneficial to contact a relevant resource owner to determine whether the user account should be removed from the shared resource 306 due to inactivity or infrequent activity. This can potentially save costs for the client organization 308 if a subscription payment is based on a number of user accounts established for the shared resource 306.

The techniques described herein can be used in association with other types of triggered events where identifying and contacting a most relevant person for a resource is important or can be helpful.

Based on a triggered event 322, event data 324 can be sent from the shared resource 306 to the monitoring system 302. The event data 324 can include an identification 326 of the shared resource 306, a type 328 of the event (e.g., a description, a title, a name, etc.), and a timestamp 330 which corresponds to when the event 322 is triggered (e.g., when a threat is detected or when a suspicious operation is performed).

The monitoring system 302 may be configured to receive the event data 324 and/or generate its own event data 324. The monitoring system 302 can comprise device(s) and/or other components that communicate with one another and/or with the shared resource 306 via network(s). Moreover, the monitoring system 302 can include a scoring module 332 and an output module 334. The number of illustrated modules is just an example, and the number can vary higher or lower. That is, functionality described herein in association with the illustrated modules can be performed by a fewer number of modules or a larger number of modules on one device or spread across multiple devices.

In some embodiments, monitoring system 302 may implement models to infer the anomaly score of data plane and control plane activity. The models can be implemented using statistical/probability models, machine learning or a rule-based approach, or any combination thereof. For example, user feedback (negative and positive) may be used as labels in a supervised learning approach for the anomaly models.

In an embodiment, data plane anomalies may be determined based on an estimated probability model of an appearance of a new entity. If the estimated probability is below a predetermined threshold, the appearance of a new entity may constitute an anomaly. In an embodiment, a control plane anomaly model may be implemented using a score-based method for each user active at a resource as a time series signal, such that a high outlier of a score may signify an unexpected spike in relevant and significant control plane activity.

In some embodiments, scoring module 332 is configured to calculate scores for a notification 304 generated based on the event 322. In an embodiment, the scoring module 332 uses the resource identification 326 to access the corresponding activity log 320 that includes previous operations performed on the shared resource 306. The scoring module 332 determines operations in the activity log 320 that are relevant to the event 322. In one example, a previous operation is determined to be relevant to the event 322 if the previous operation was performed in a recent time window (e.g., the last hour, last twenty-four hours, the last week, the last month) established based on the timestamp 330. The recent time window can be a predefined amount of time before the timestamp 330. In another example, a previous operation is determined to be relevant to the event 322 if the previous operation is performed by users 316 that are authorized to configure the shared resource 306 in accordance with a policy established for the client organization 308, and thus, the relevant previous operations may be limited to those that occur in the control plane 132 of the shared resource 306.

FIG. 3 illustrates that the activity log 320 includes a sequence of line items that identify a user identification that performed an operation at a time marked by a timestamp. The timestamp is used to ensure that a corresponding operation is performed within the recent time window. In various examples, the scoring module 332 uses a model 336 to calculate an operation relevance score for each previous operation determined to be relevant to the event 322, thereby producing multiple operation relevance scores 338. As further described herein with respect to FIG. 4, an operation relevance score is calculated using a significance rating and an age rating.

The monitoring system 302 can replicate the aforementioned functionality across a large number of resources and/or a large number of client organizations. Accordingly, in various examples, device(s) of the monitoring system 302 can include one or more computing devices that operate in a cluster or other grouped configuration to share resources, balance load, increase performance, provide fail-over support or redundancy, or for other purposes. For instance, device(s) of the monitoring system 302 can belong to a variety of classes of devices such as server-type devices, desktop computer-type devices, mobile-type devices, special purpose-type devices, embedded-type devices, and/or wearable-type devices. A client device used by the person 344 can include, but is not limited to, a desktop computer, a game console and/or a gaming device, a tablet computer, a personal data assistant (PDA), a mobile phone/tablet hybrid, a laptop computer, a telecommunication device, a wearable device, a work station, or any other sort of computing device.

Figure 4:
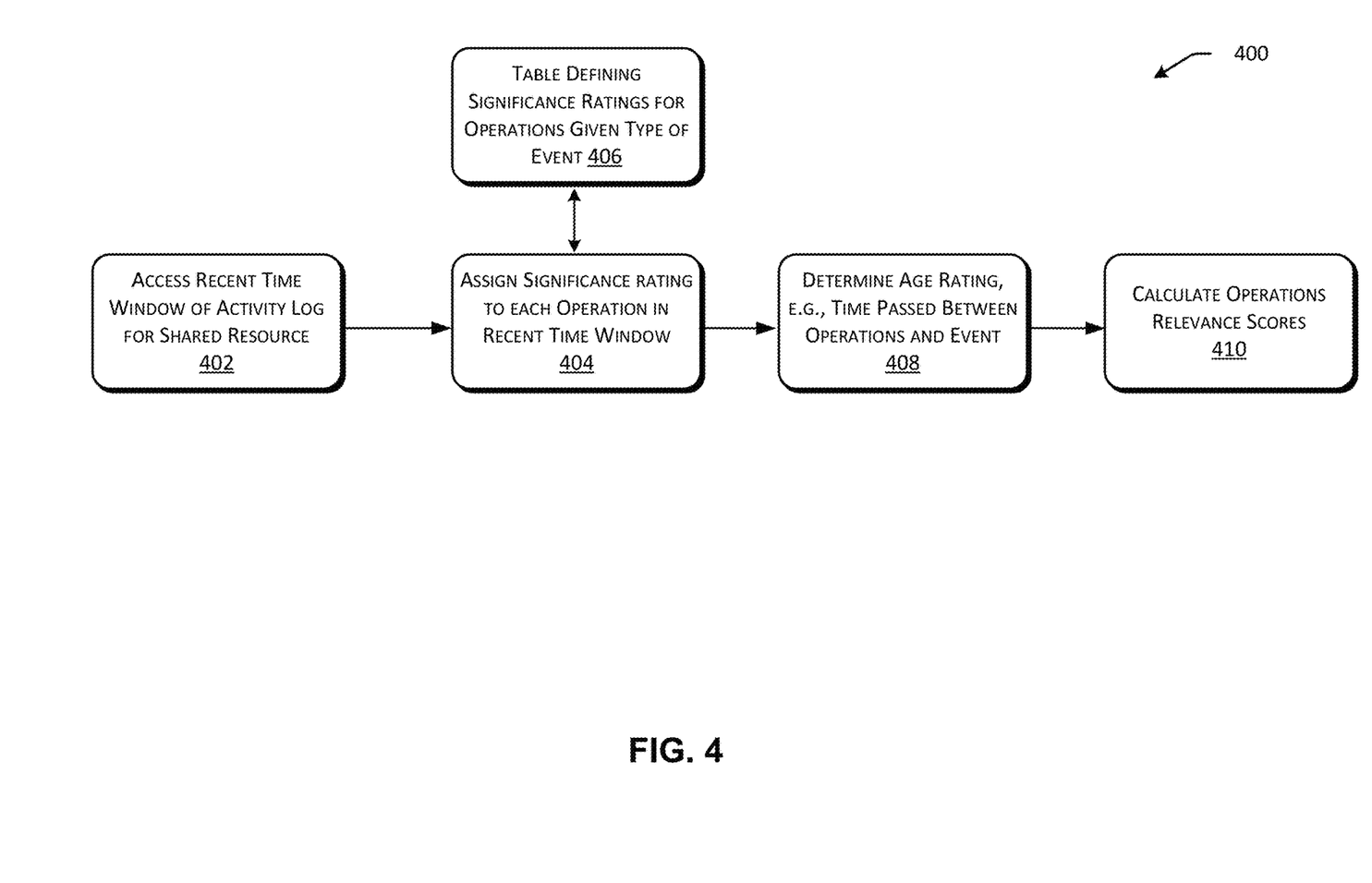
FIG. 4 illustrates an example environment for performing anomaly detection according to the embodiments disclosed herein.

FIG. 4 is a block diagram 400 illustrating different stages applied to determine a score according to the present disclosure. As shown by block 402, the model 136 accesses previous operations that occurred within a recent time window. The recent time window may be a predefined amount of time.

As shown, the activity log may list different user identifications for administrators of the shared resource. The activity log may also list the type of configuration operations (e.g., a name, a description, etc.) performed, such as a "firewallRules/write" operation, a "virtualNetworkRules/write" operation, a "policies/audit/action" operation, an "auditifNotExists/action" operation, and a "databases/write" operation. Finally, the activity log may list time of occurrence for a corresponding operation based on some defined time unit (e.g., a specific day, a specific hour, a specific minute, etc.).

As shown by block 404, the model 136 assigns a significance rating to each operation in the recent time window. In various examples, the significance rating may be determined based on an association between a type of the previous operation in the activity log and a type 128 of the event 122. For example, the model 136 may be configured to map the previous operation in the activity log to a corresponding predetermined significance rating stored in a significance rating table 406 that lists operation-specific significance ratings for the type 128 of the event 122.

As shown by block 408, the model 136 may determine an age rating for each of the previous operations. In various examples, the age rating represents an amount of time between a time when the previous operation is performed and a time when the event 122 is triggered (e.g., when a threat is detected). The amount of time may be based on a broad or granular time unit (e.g., a number of days, a number of hours, a number of minutes, a number of seconds).

Next at block 410, the model 136 may calculate an operation relevance score for each operation. In one example, the operation relevance score is the significance rating weighted by a decay coefficient based on the age rating so that the relevance score for an operation is directly proportional to both significance and recency. In a more specific example, for a specific notification generated for an event that occurs at time t on shared resource r, the model 136 is configured to go through all the operations performed by users on the shared resource r in a pre-defined time window (e.g., one day, one week, one month, etc.) before time t. As described above, these operations may be limited to configuration operations that occur in the control plane 112 of the shared resource r.

The model 136 assigns each relevant operation a significance rating based on operation o relevance to the specific notification n (e.g., describing a type of the event 122), which can be represented as follows:

$s_{o,n}$—significance rating of operation o in relation to notification n

In addition, the model 136 determines an age rating for each operation, which represents the time passed, e.g., in number of hours or days, as follows:

$h_{o,t}$—age of operation o in relation to alert time t

Consequently, the relevance score per operation can be calculated by the model 136 as follows:

$$r_{o,n} = s_{o,n} \cdot e^{-h_{o,t}}$$

Figure 5:
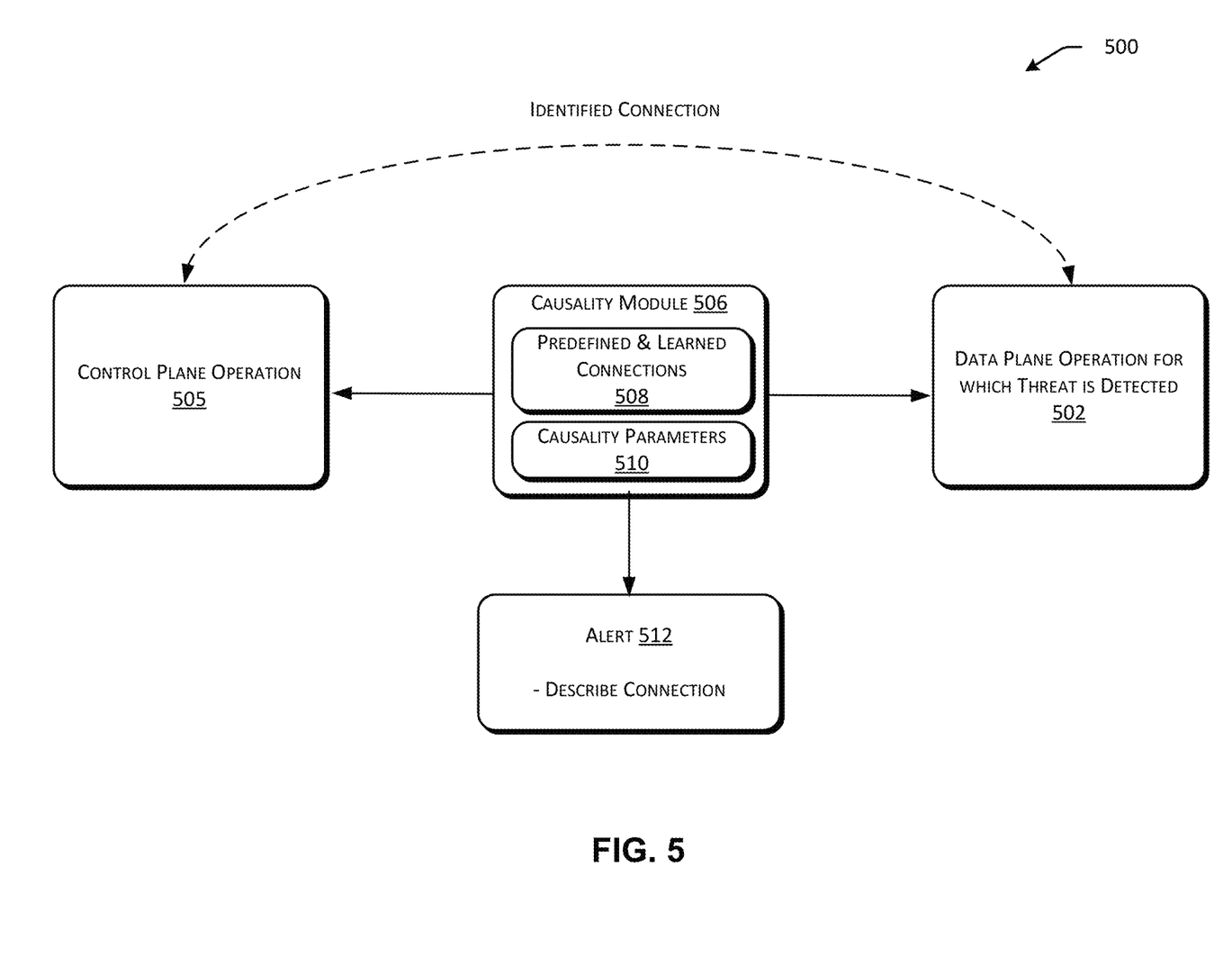
FIG. 5 illustrates an example environment for performing anomaly detection according to the embodiments disclosed herein.

FIG. 5 is a block diagram 500 illustrating how an identified connection can be established between a data plane operation for which a threat is detected 502 and a control plane operation 505. FIG. 5 illustrates a causality module 506 that stores predefined and/or learned connections 508. These connections represent relationships between control plane operations and data plane operations that cause alerts.

For example, the control plane operation 505 may alter the configuration of a firewall to allow access to a new IP address and the data plane operation for which the threat is detected 502 may be a data access by the new IP address. The causality module 506 can use different causality parameters 510, such as an acceptable time period, to identify a connection between a suspicious operation and a previous operation, and to lessen the severity of an alert. For example, an acceptable time period can be used to determine that a new IP address access may not be suspicious because the configuration of the firewall was altered shortly before (e.g., within five minutes, within an hour, etc.) the new IP address access occurred. In other words, an owner of the resource intentionally altered the configuration state of the resource to allow for the data access via the new IP address.

A description of this identified connection can then be added to the alert 512 so the security officer and/or the most relevant person(s) can be immediately informed that the alert is being sent out of an abundance of caution and that the suspicious activity can be explained. Alternatively, the identified connection can be used to suppress the alert.

The connections between two operations and the causality parameters (e.g., an acceptable time period in which the two operations must occur) can be predefined by a user (e.g., an owner of the resource). Alternatively, supervised learning can be used to learn the connections and the causality parameters based on human feedback (e.g., labeled training data). For example, owners or resources may commonly dismiss specific types of alerts that are triggered right after a specific type of configuration operation is performed. This feedback can be used to learn the connection between operations 502 and 505 based on a causality parameter 510. Various machine learning techniques may be utilized, such as classification analysis, regression analysis, clustering, Naïve Bayes, k-nearest neighbor algorithm, majority classifier, support vector machines, random forests, boosted trees, Classification and Regression Trees (CART), neural networks, and so on.

Figure 6:
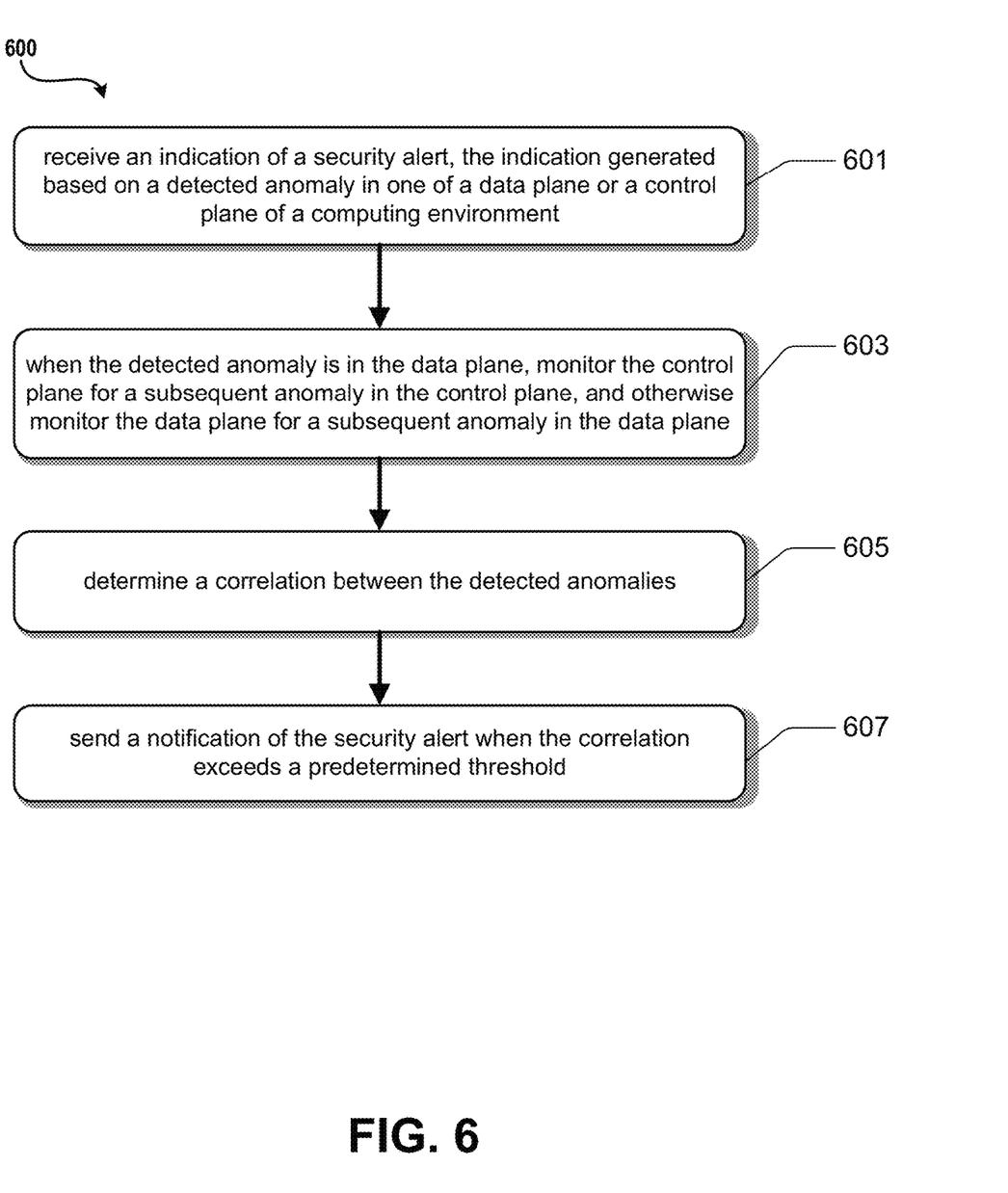
FIG. 6 is a flowchart depicting an example procedure for performing anomaly detection in accordance with the present disclosure.

Turning now to FIG. 6, illustrated is an example operational procedure for performing threat detection in a computing environment in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 6, operation 601 illustrates receiving an indication of a security alert, the indication generated based on a detected anomaly in one of a data plane or a control plane of a computing environment.

Operation 601 may be followed by operation 603. Operation 603 illustrates when the detected anomaly is in the data plane, monitoring the control plane for a subsequent anomaly in the control plane, and otherwise monitoring the data plane for a subsequent anomaly in the data plane.

Operation 603 may be followed by operation 605. Operation 605 illustrates determining a correlation between the detected anomalies.

Operation 605 may be followed by operation 607. Operation 607 illustrates sending a notification of the security alert when the correlation exceeds a predetermined threshold.

In an embodiment, the indication is generated based on a detected anomaly in the data plane, and the detected anomaly is a new entity accessing a resource.

In an embodiment, the new entity is an entity observed during a modeling period.

In an embodiment, the indication is generated based on a detected anomaly in the control plane, and the detected anomaly is a user performing an anomalous pattern or amount of operations.

In an embodiment, the correlation is determined based on a similarity of a {resource, entity, time-window} tuple.

In an embodiment, the entity comprises one or more of a machine name, a username, an IP address, a process name, or a network identifier.

In an embodiment, the anomaly is determined based on a detection model comprising evaluating mean and distance in standard deviations.

In an embodiment, an active listening mode to monitor the control plane or the data plane is activated.

In an embodiment, the correlation is determined by combining logs of data plane activity with logs of correlated control plane activity.

In an embodiment, user feedback pertaining to notifications is received; and the user feedback is input as labels to a learning model for identifying security alerts.

In an embodiment, data plane anomalies are determined based on an estimated probability model of an appearance of a new entity and control plane anomalies are determined using a score-based method for each user active at a resource.

Figure 7:
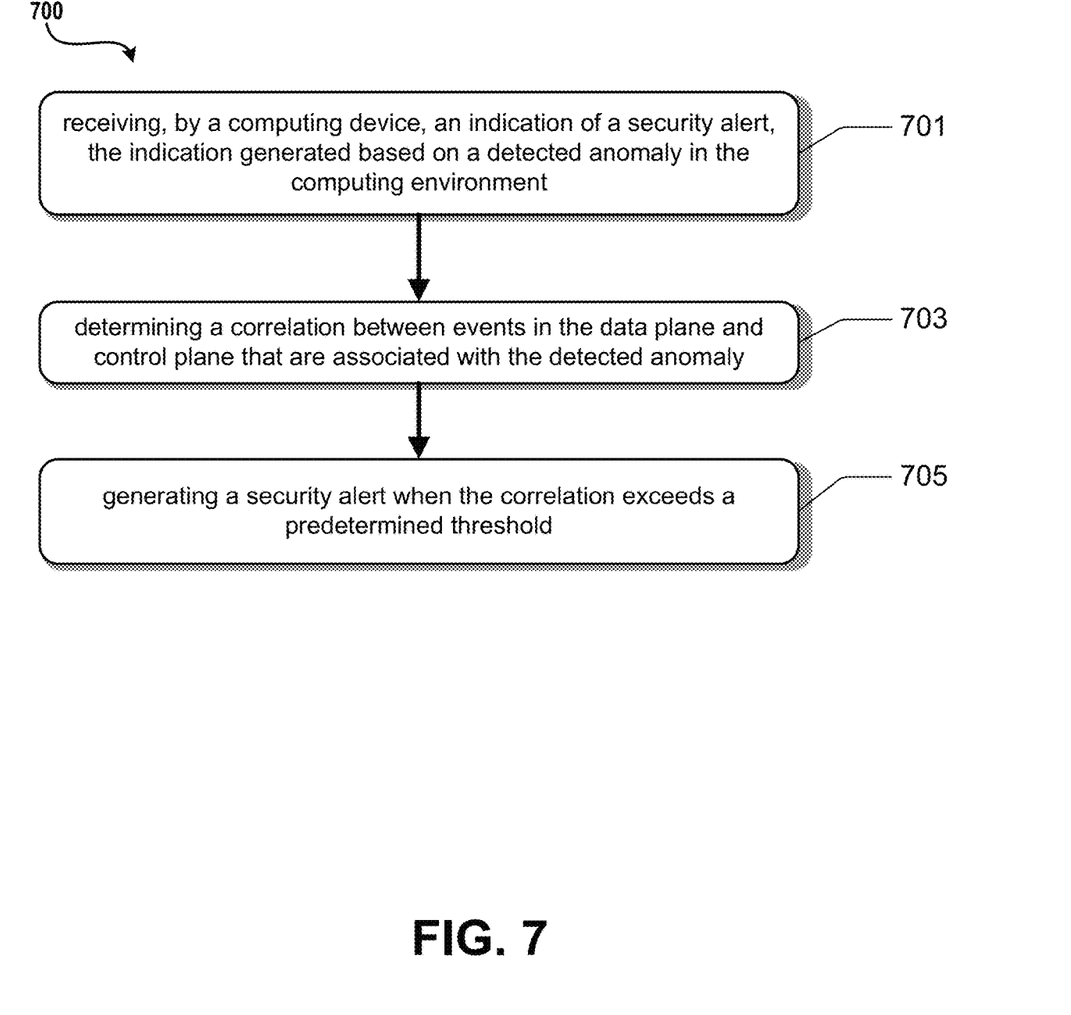
FIG. 7 is a flowchart depicting an example procedure for performing anomaly detection in accordance with the present disclosure.

Turning now to FIG. 7, illustrated is an example operational procedure for performing threat detection in a computing environment in accordance with the present disclosure. The operational procedure may be implemented in a system comprising one or more computing devices.

Referring to FIG. 7, operation 701 illustrates receiving, by a computing device, an indication of a security alert, the indication generated based on a detected anomaly in the computing environment. In an embodiment, the anomaly is detected in one of a data plane or a control plane of the computing environment.

Operation 701 may be followed by operation 703. Operation 703 illustrates determining a correlation between events in the data plane and control plane that are associated with the detected anomaly.

Operation 703 may be followed by operation 705. Operation 705 illustrates generating a security alert when the correlation exceeds a predetermined threshold.

In an embodiment:

data plane anomalies are determined based on an estimated probability model of an appearance of a new entity; and an appearance of a new entity is determined to constitute an anomaly when the estimated probability is below a predetermined threshold.

In an embodiment:

control plane anomalies are determined based on an anomaly model implemented using a score-based method for each user active at a resource as a time series signal; and a high outlier of a score signifies a control plane anomaly.

In an embodiment, the anomaly is detected in the data plane and the detected anomaly is a new entity accessing a resource.

In an embodiment, the anomaly is detected in the control plane and the detected anomaly is a user performing an anomalous pattern or amount of operations.

In an embodiment, the correlation is determined based on a similarity of a {resource, entity, time-window} tuple.

In an embodiment, an active listening mode is activated to monitor the control plane or the data plane.

In an embodiment:

user feedback pertaining to notifications is received; and the user feedback is input as labels to a learning model for identifying security alerts.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 300 illustrated in FIG. 3, which are configured to host physical and/or virtualized computer servers, storage devices, networking equipment and the like, that may be used to implement and distribute the infrastructure and services offered by the service provider.

Figure 8:
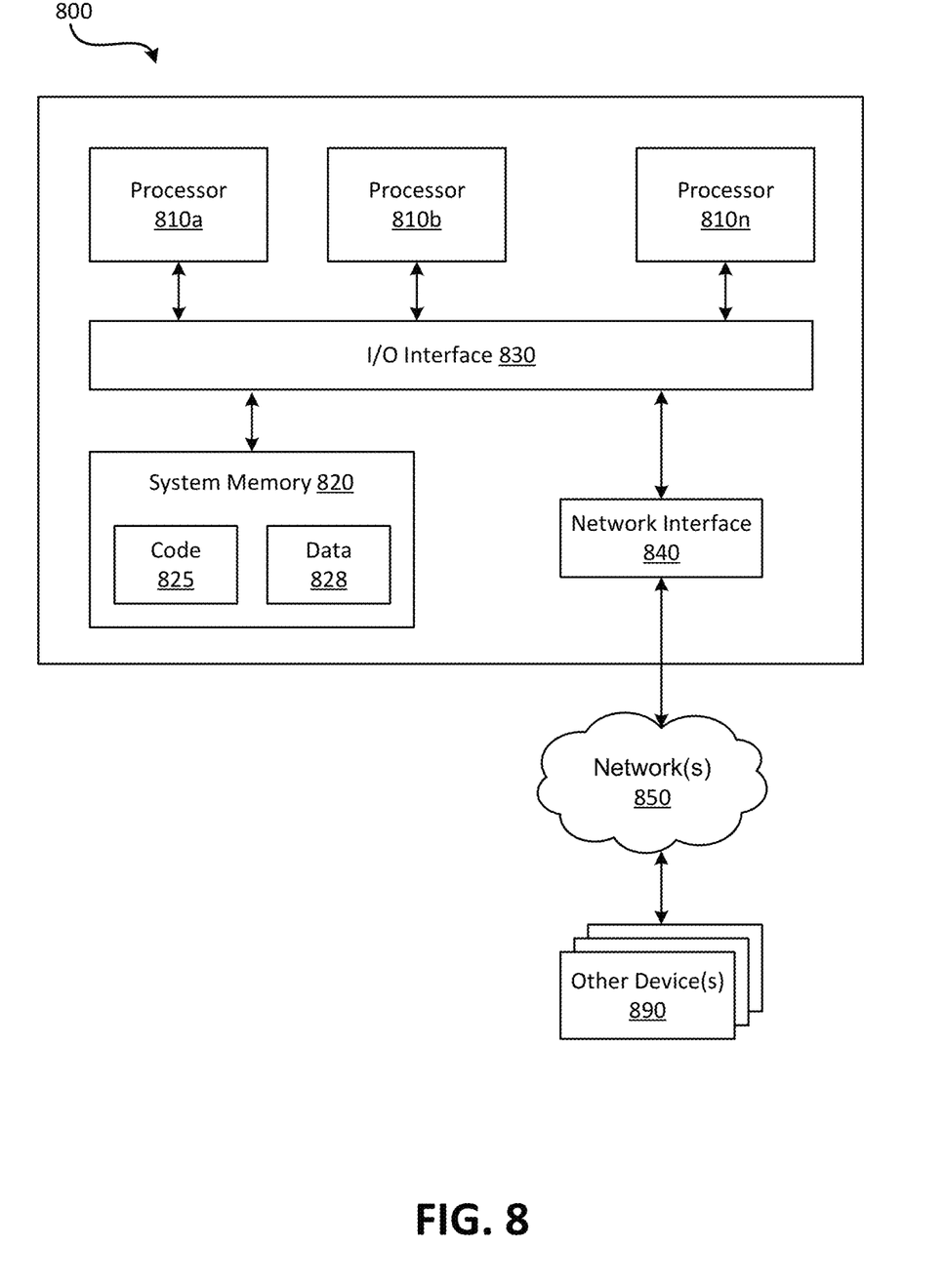
FIG. 8 is an example computing device in accordance with the present disclosure.

In some embodiments, a computing device that implements a portion or all of one or more of the technologies described herein, including the techniques to implement the detection of unauthorized use of user credentials in a network implementing an authentication protocol may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 890 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing system comprising:
   one or more processors; and
   one or more computer-readable media having thereon computer-executable instructions that are structured such that, when executed by the one or more processors, cause the computing system to:
   receive an indication of a security alert, the indication generated based on a detected anomaly in one of a data plane or a control plane of a computing environment;
   when the detected anomaly is in the data plane, monitor the control plane for a subsequent anomaly in the control plane, and otherwise monitor the data plane for a subsequent anomaly in the data plane;
   determine a first correlation between the detected anomaly and the subsequent anomaly in the control plane when the detected anomaly is in the data plane;
   determine a second correlation between the detected anomaly and the subsequent anomaly in the data plane when the detected anomaly is in the control plane; and
   send a notification of the security alert when the first correlation between the detected anomaly and the subsequent anomaly in the control plane or the second correlation between the detected anomaly and the subsequent anomaly in the data plane exceeds a predetermined threshold.

2. The computing system of claim 1, wherein the indication is generated based on a detected anomaly in the data plane, and the detected anomaly is a new entity accessing a resource.

3. The computing system of claim 2, wherein the new entity is an entity observed during a modeling period.

4. The computing system of claim 1, wherein the indication is generated based on a detected anomaly in the control plane, and the detected anomaly is a user performing an anomalous pattern or amount of operations.

5. The computing system of claim 1, wherein the first correlation and the second correlation are determined based on a similarity of a tuple comprising one or more of a resource, entity, or time-window.

6. The computing system of claim 5, wherein the entity comprises one or more of a machine name, a username, an IP address, a process name, or a network identifier.

7. The computing system of claim 1, wherein the anomaly is determined based on a detection model comprising evaluating mean and distance in standard deviations.

8. The computing system of claim 1, further comprising computer-executable instructions that are structured such that, when executed by the one or more processors, cause the computing system to activate an active listening mode to monitor the control plane or the data plane.

9. The computing system of claim 1, wherein the first correlation and the second correlation are determined by combining logs of data plane activity with logs of correlated control plane activity.

10. The computing system of claim 1, further comprising computer-executable instructions that are structured such that, when executed by the one or more processors, cause the computing system to:
    receive user feedback pertaining to notifications; and
    input the user feedback as labels to a learning model for identifying security alerts.

11. The computing system of claim 1, wherein data plane anomalies are determined based on an estimated probability model of an appearance of a new entity and control plane anomalies are determined using a score-based method for each user active at a resource.

12. A method for performing threat detection in a computing environment, the method comprising:
    receiving, by a computing device, an indication of a security alert, the indication generated based on a detected anomaly in the computing environment, wherein the anomaly is detected in one of a data plane or a control plane of the computing environment;
    determining a first correlation between the detected anomaly and a subsequent anomaly in the control plane when the detected anomaly is in the data plane;
    determining a second correlation between the detected anomaly and a subsequent anomaly in the data plane when the detected anomaly is in the control plane; and
    generating a security alert when the first correlation between the detected anomaly and the subsequent anomaly in the control plane or the second correlation between the detected anomaly and the subsequent anomaly in the data plane exceeds a predetermined threshold.

13. The method of claim 12, wherein:
    data plane anomalies are determined based on an estimated probability model of an appearance of a new entity; and
    the appearance of the new entity is determined to constitute an anomaly when the estimated probability is below a predetermined threshold.

14. The method of claim 12, wherein:
control plane anomalies are determined based on an anomaly model implemented using a score-based method for each user active at a resource as a time series signal; and
a high outlier of a score signifies a control plane anomaly.

15. The method of claim 12, wherein the anomaly is detected in the data plane and the detected anomaly is a new entity accessing a resource.

16. The method of claim 12, wherein the anomaly is detected in the control plane and the detected anomaly is a user performing an anomalous pattern or amount of operations.

17. The method of claim 12, wherein the first correlation and the second correlation are determined based on a similarity of a tuple comprising one or more of a resource, entity, or time-window.

18. The method of claim 12, further comprising activating an active listening mode to monitor the control plane or the data plane.

19. The method of claim 12, further comprising:
receiving user feedback pertaining to notifications; and
inputting the user feedback as labels to a learning model for identifying security alerts.

20. A non-transitory computer program product comprising one or more computer-readable storage media having thereon computer-executable instructions that are structured such that, when executed by one or more processors of a computing system, cause the computing system to perform operations comprising:
receiving, by a computing device, an indication of a security alert, the indication generated based on a detected anomaly in a computing environment, wherein the anomaly is detected in one of a data plane or a control plane of the computing environment;
determining a first correlation between the detected anomaly and a subsequent anomaly in the control plane when the detected anomaly is in the data plane;
determining a second correlation between the detected anomaly and a subsequent anomaly in the data plane when the detected anomaly is in the control plane; and
generating a security alert when the first correlation between the detected anomaly and the subsequent anomaly in the control plane or the second correlation between the detected anomaly and the subsequent anomaly in the data plane exceeds a predetermined threshold.

* * * * *